[12] United States Patent
Billings et al.

(10) Patent No.: US 12,287,559 B2
(45) Date of Patent: Apr. 29, 2025

(54) CAMERA MOUNTING ASSEMBLY (71) Applicant: BearCom Group, Inc., Garland, TX (US)

(72) Inventors: Carson Billings, Garland, TX (US); Colby Festner, Houston, TX (US)

(73) Assignee: BEARCOM GROUP, INC., Garland, TX (US)

( * ) Notice: Subject to any disclaimer, the term of this patent is extended or adjusted under 35 U.S.C. 154(b) by 157 days.

(21) Appl. No.: 18/092,607

(22) Filed: Jan. 3, 2023

(65) Prior Publication Data
US 2023/0213842 A1 Jul. 6, 2023

Related U.S. Application Data (60) Provisional application No. 63/296,407, filed on Jan. 4, 2022.

(51) Int. Cl.
G03B 17/56 (2021.01)
F16M 13/02 (2006.01)
F16M 11/20 (2006.01)

(52) U.S. Cl.
CPC ......... G03B 17/561 (2013.01); F16M 13/022 (2013.01); F16M 11/2014 (2013.01); F16M 2200/022 (2013.01)

(58) Field of Classification Search
CPC .................................................. F16M 13/08
See application file for complete search history.

(56) References Cited

U.S. PATENT DOCUMENTS

| | | | | |
|---|---|---|---|---|
| 6,561,473 B1 * | 5/2003 | Ianello | .................. | F16B 7/0493 403/384 |
| 7,883,065 B2 * | 2/2011 | Nelson | ............... | F16M 11/2021 248/70 |
| 9,810,369 B2 * | 11/2017 | Lilieholm | ............ | F16M 13/022 |
| 2021/0278754 A1 * | 9/2021 | Boyes | .............. | G08B 13/19632 |

OTHER PUBLICATIONS

DH-PFA152-E product page <https://www.dahuasecurity.com/my/products/All-Products/Accessories/Camera-Accessories/Camera-Mounts/Pole-Mount-Brackets/PFA152-E >, archive.org copy dated Feb. 28, 2021 (Year: 2021).*
DH-PFA152-E datasheet retrieved from <https://www.dahuasecurity.com/asset/upload/product/20180523/DH-PFA152-E_datasheet.pdf>, archive.org copy dated Feb. 8, 2020 (Year: 2020).*
"Universal Mounting Plate for Sanwa and Seimitsu Levers" listing by NightImage at <https://www.etsy.com/listing/922542394/universal-mounting-plate-for-sanwa-and?show_sold_out_detail=1&ref=nla_listing_details> Accessed Dec. 17, 2024 (Year: 2024).*

* cited by examiner

Primary Examiner — Leon W Rhodes, Jr.
(74) Attorney, Agent, or Firm — Jeffer Mangels Butler & Mitchell LLP; Brennan C. Swain, Esq.

(57) ABSTRACT

Camera mounting assemblies and mounting plates. A mounting plate includes a body. The body includes a center portion. The body further includes an extension member extending away from the center portion in a coplanar direction. The body further includes a first mounting hole located on the extension member. The first mounting hole is configured to receive a first attachment. The body further includes a second mounting hole. The second mounting hole is located on the center portion and is configured to receive a second attachment, the second attachment being different than the first attachment. The body further includes an opening. The opening is located on the center portion and is (Continued)

configured to provide a path for an electrical conduit to be coupled to the second attachment.

5 Claims, 8 Drawing Sheets

CAMERA MOUNTING ASSEMBLY

CROSS-REFERENCE TO RELATED APPLICATIONS

This application claims the benefit of U.S. Provisional Application No. 63/296,407, filed on Jan. 4, 2022, the entirety of which is incorporated by reference herein.

FIELD OF THE INVENTION

The present invention relates to cameras, particularly to camera mounts and mounting assemblies.

BACKGROUND OF THE INVENTION

Picture and/or motion picture capturing devices or cameras often require to be mounted or affixed to a desired or required location for hands-free and/or continuous use. Such instances may include surveillance and film production. There is a wide range of capturing devices that come in different sizes, shapes, and specifications. Due to such differences, requisite mounting tools, parts, instructions, and/or techniques may also differ between each camera. For instance, each camera may require purchasing a specific mounting assembly or a mounting plate. If the camera is later changed, replaced, or adjusted, the mounting plate may be no longer suitable. As such, there is a need for a universal mounting assembly that may accommodate cameras having different configurations.

The background description disclosed anywhere in this patent application includes information that may be useful in understanding the present invention. It is not an admission that any of the information provided herein is prior art or relevant to the presently claimed invention, or that any publication specifically or implicitly referenced is prior art.

SUMMARY OF THE PREFERRED EMBODIMENTS

The present invention includes mounting plates and mounting assemblies for cameras. A preferred embodiment is embodied in a mounting plate. The mounting plate has a body. The body has a center portion. The center portion has a first face and a second face opposing the first face. The center portion has multiple sides defined by a thickness between the first face and the second face. The body has multiple extension members each extending away from the center portion along an axis perpendicular to a different side of the multiple sides. The body has multiple first mounting holes. Each mounting hole may be located on a different extension member. The multiple first mounting holes are configured to receive a first attachment. The body has multiple second mounting holes that may be located on the center portion. The multiple second mounting holes are configured to receive a second attachment. The second attachment is different than the first attachment. The body has an opening located on the center portion. The opening is configured to provide a path for an electrical conduit to be coupled to the second attachment.

Another preferred embodiment is embodied in a mounting plate. The mounting plate has a body. The body has a center portion. The center portion has a first face and a second face opposing the first face. The center portion has multiple sides defined by a thickness between the first face and the second face. The body has an extension member extending away from the center portion along an axis perpendicular to one or more sides of the center portion. The body has a first mounting hole located on the extension member. The first mounting hole is configured to receive a first attachment. The body has multiple second mounting holes located on the center portion. The multiple second mounting holes are configured to receive a second attachment. The second attachment is different than the first attachment. The body has an opening located on the center portion. The opening is configured to provide a path for an electrical conduit to be coupled to the second attachment.

Yet another preferred embodiment is embodied in a camera mounting assembly. The camera mounting assembly includes a mounting plate. The mounting plate has a center portion. The center portion has a first face and a second face opposing the first face. The center portion has multiple sides defined by a thickness between the first face and the second face. The mounting plate has an extension member extending away from the center portion along an axis perpendicular to one or more sides of the center portion. The mounting plate has a first mounting hole located on the extension member. The mounting plate has multiple second mounting holes located on the center portion. The mounting plate has an opening located on the center portion. The camera mounting assembly includes a first fastener configured to be inserted through the first mounting hole to attach a mounting location to the mounting plate. The camera mounting assembly includes multiple second fasteners. Each second fastener is configured to be inserted through a second mounting hole of the multiple second mounting holes to attach a camera to the mounting plate. The opening is configured to provide a path for an electrical conduit to be coupled to the camera.

The present invention also includes a method for connecting, securing or attaching a first camera or other attachment to the mounting plate using any of the mounting holes or sets of mounting holes, removing the first camera and then attaching a second camera using any of the mounting holes or sets of mounting holes (either the same or different). The same mounting plate and camera mounting assembly can be utilized for different events or situations with different cameras. The universality and/or versatility of the holes, sets of holes and arrangements thereof is what makes the camera mounting assembly inventive and useful.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the-disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional. Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way.

Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward" and "below" used herein are merely for ease of description and refer to the orientation of the components as shown in the figures. It should be understood that any orientation of the components described herein is within the scope of the present invention.

The present invention includes a camera mounting assembly 10. The camera mounting assembly 10 is configured such that a variety of cameras having unique mounting requirements may be compatible with it. The camera mounting assembly 10 may be secured or attached to a variety of surfaces and objects, such as poles, trusses, etc. The camera mounting assembly 10 may be used in rental spaces or events where compatibility of many types of cameras are desired. Hence, cameras will not have to be physically modified and camera positioning will not be impaired by having a universal mounting assembly.

The figures are generally directed to camera mounting assemblies. FIGS. 1-7 show the camera mounting assembly 10. The assembly 10 may be mounted on a pole 102. The assembly 10 may be compatible to couple a variety of cameras 100 to the pole 102. The camera mounting assembly 10 may include a bracket or mounting plate 12. The camera mounting assembly may further include one or more clamp assemblies 14. Two clamp assemblies 14 are shown by example in FIGS. 1-7. One clamp or more than two clamps are also within the scope of the invention. In other examples, other suitable fasteners may replace or be utilized in addition to the clamp assembly 14. For example, screws, rings, clamps, and/or the like may be suitable fasteners.

Figure 3:
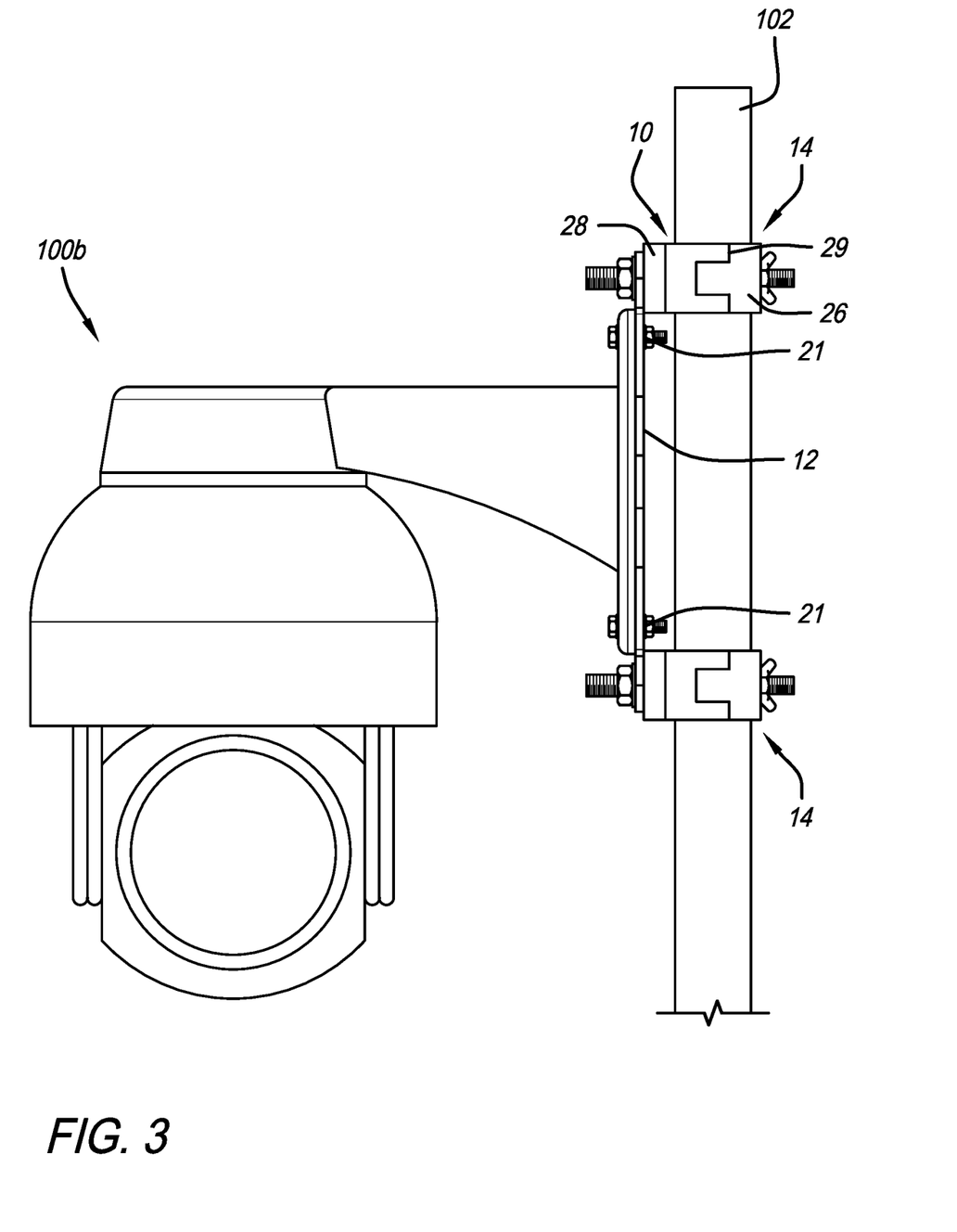
FIG. 3 is a side view of the mounting assembly of FIG. 1 in use with a second camera in accordance with a preferred embodiment of the present invention.

A clamp assembly 14 may include any type of clamp that may couple to the pole 102 or another mounting area or surface. In some examples, the clamp assemblies 14 may include a clamp portion 26. The clamp portion 26 may be hingedly connected to the hinge base 28. A hinged connection 29 is shown in FIG. 3. The hinge base 28 may include a pivotable threaded fastener 30 that extends through and is secured to a distal end of the clamp portion 26 via a wing nut 32 or any other suitable fastener. The hinge base 28 may include a threaded fastener 34 that extends oppositely of the clamp portion 26. The threaded fastener 34 may extend through a clamp assembly mounting hole (also referred to as a first mounting hole) 20 in the mounting plate 12. A wing nut 32 or another suitable fastener may be used to secure the threaded fastener 34 thereto. The clamp assembly 14 may be clamped or connected to posts, trusses, or other objects, thereby providing versatility for mounting cameras.

Figure 1:
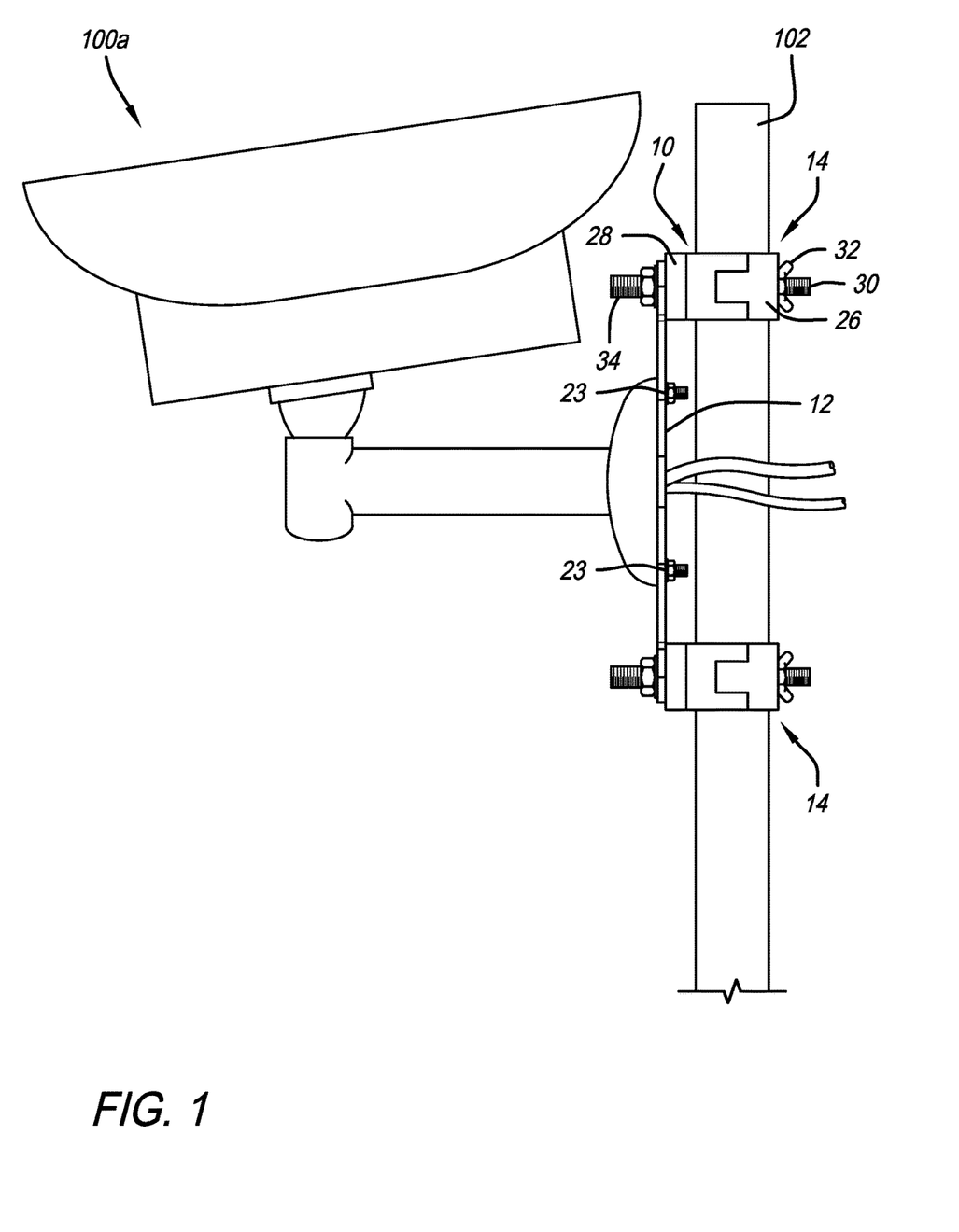
FIG. 1 is a side view of a mounting assembly in use with a first camera in accordance with a preferred embodiment of the present invention.

FIG. 1 is a side view of a camera mounting assembly 10 in use with a first camera 100a. The camera 100a may be shaped and sized such that third mounting holes 23 (see FIG. 2) are utilized to couple the camera 100a to the mounting plate 12 via fasteners passing therethrough.

Figure 2:
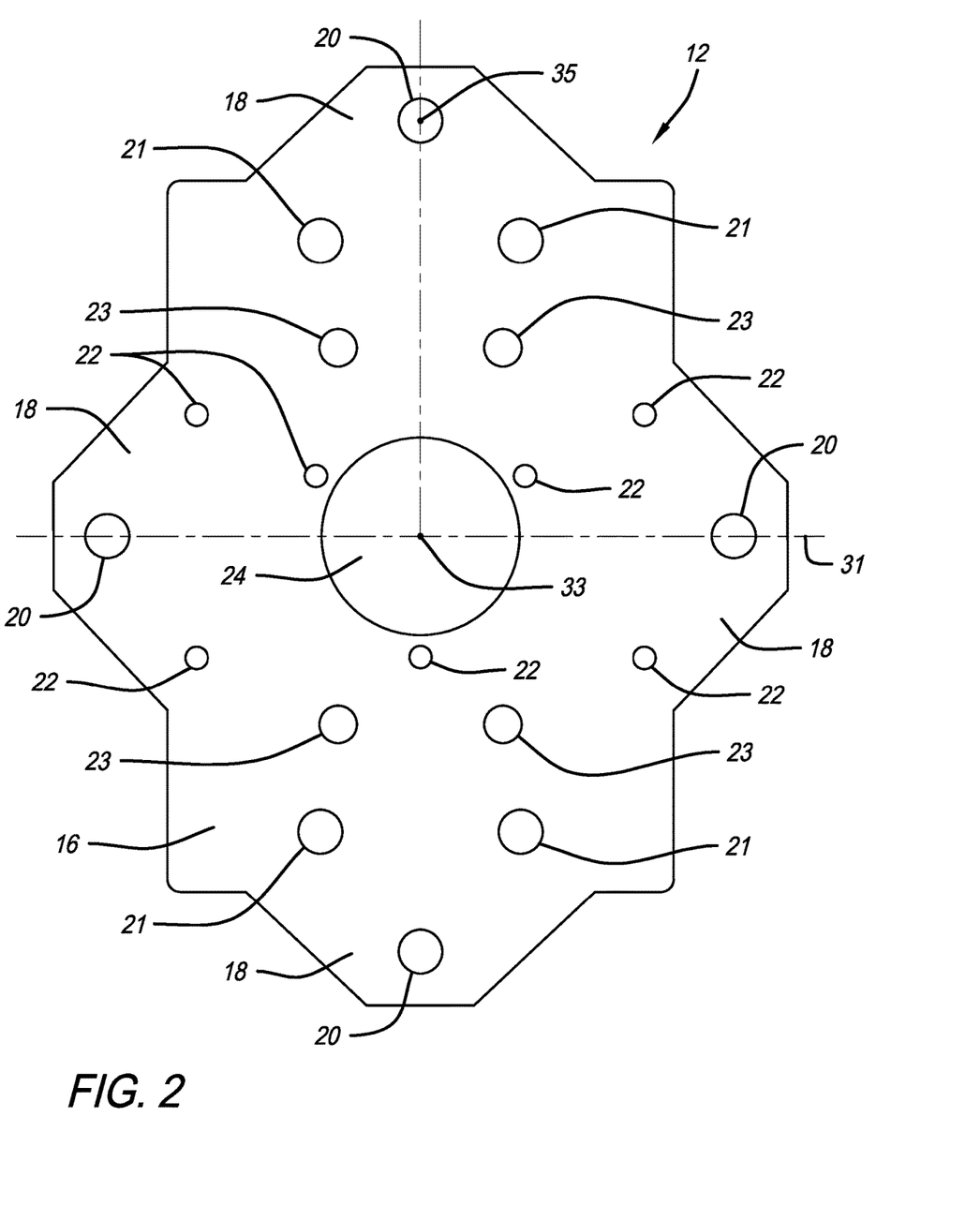
FIG. 2 is a front view of a mounting plate of the mounting assembly of FIG. 1 in accordance with a preferred embodiment of the present invention.

FIG. 2 is a front view of a mounting plate 12 of the camera mounting assembly 10. The mounting plate 12 may be metal, plastic, wood, glass or any other rigid material. The mounting plate 12 may be unitary construction (a single piece) or be an assembly. The mounting plate 12 may have a center portion 16. One or more extension members 18 may extend away or outwardly from the center portion 16 as shown in FIG. 2. The center portion 16 may have a rectangular shape. In other examples, the center portion 16 may be another shape, such as round, square, triangular, or the like. In FIG. 2, the extension members 18 extend outwardly from the top, bottom and opposing sides of the center portion 16. The extension members 18 may have a trapezoidal shape. In other examples, the extension members 18 may be another shape, such as round, square, triangular, or the like. The extension members 18 may be evenly distributed around the center portion 16. Each side of the center portion 16 may have an extension member 18 extending therefrom. Four extension members 18 are shown in FIG. 2 as an example.

An extension member 18 may have a first mounting hole 20 (the first mounting holes are defined through the extension members 18). The first mounting hole 20 may be shaped and sized to receive a first attachment or a fastener to couple the mounting plate 12 to the pole 102 and/or the clamp assembly 14. The first mounting hole 20 may preferably have an approximately 11 millimeter (mm) diameter. However, this is not a limitation and the first mounting hole (or any of the holes, openings or components discussed herein) can have any dimension. Dimensions are only exemplary and not limiting.

The center portion 16 may have one or more second mounting holes 21 defined therein or therethrough. The second mounting hole 21 may be shaped and sized to receive a second attachment or a fastener to couple the mounting plate 12 to a camera 100, such as the camera 100b of FIG. 3. The second mounting hole 21 may preferably have an approximately 10 mm diameter. Four second mounting holes 21 are shown in FIG. 2. However, this is not a limitation and more or less third mounting holes can be included. The four second mounting holes 21 can be included for mounting of a camera that includes fasteners spaced apart to fit through the four second mounting holes 21, which form a second mounting hole set.

The first mounting hole 20 and a pair of second mounting holes 21 may form a triangular arrangement. The first mounting hole 20 and the pair of second mounting holes 21 may be equidistant from each other.

The center portion 16 may have an opening 24. The opening 24 may be round as shown in FIG. 2 or any other shape. The opening 24 may provide a path for an electrical conduit 25 (see FIG. 1) such as a power cord, an audio/video cord, and/or any other wiring to extend therethrough and be electrically coupled to the camera 100. In some examples, the opening 24 may receive a fastener to couple the mounting plate 12 to a camera, such as the camera 100e (see FIG. 6). The opening 24 may preferably have an approximately 50 mm diameter. A center 33 of the opening 24 and a center 35 of the first mounting hole 20 may be aligned, as shown in FIG. 2.

The center portion 16 may have one or more third mounting holes 23 located inboard of the second mounting holes 21. The third mounting hole 23 may be shaped and sized to receive a third attachment or a fastener to couple the mounting plate 12 to a camera 100, such as the camera 100a of FIG. 1. The third mounting hole 23 may preferably have an approximately 10 mm diameter. Four third mounting holes 23 are shown in FIG. 2. However, this is not a limitation and more or less third mounting holes can be included. The four third mounting holes 23 can be included for mounting of a camera that includes fasteners spaced apart to fit through the four third mounting holes 23, which form a third mounting hole set.

The first mounting hole 20 and a pair of third mounting holes 23 may form a triangular arrangement. The triangular arrangement may be an isosceles triangle shape.

The center portion 16 may have one or more fourth mounting holes 22. The fourth mounting hole 22 may be shaped and sized to receive a fourth attachment or a fastener to couple the mounting plate 12 to a camera 100, such as the camera 100c and 100d (see FIGS. 4-5). The fourth mounting hole 22 may preferably have an approximately 5 mm diameter.

At least some of the fourth mounting holes 22 may form an equilateral triangular shape around the opening 24 as shown in FIG. 2 (and form a triangular fourth mounting hole set). In some examples, at least some of the fourth mounting holes 22 may instead or additionally form a triangular shape with a first mounting hole 20 as shown in FIG. 2. The mounting plate 12 may be mirrored about an axis 31 bisecting the mounting plate 12. A rectangular fourth mounting hole set may be formed by four fourth mounting holes 22 that are positioned outboard of the triangular fourth mounting hole set and inboard of the extension members 18 that extend outwardly from the opposing sides of the center portion.

FIG. 3 is a side view of the mounting assembly 10 in use with a second camera 100b. The camera 100b may be shaped and sized such that second mounting holes 21 (or the second mounting hole set) are utilized to couple the camera 100b to the mounting plate 12 via fasteners passing therethrough.

Figure 4:
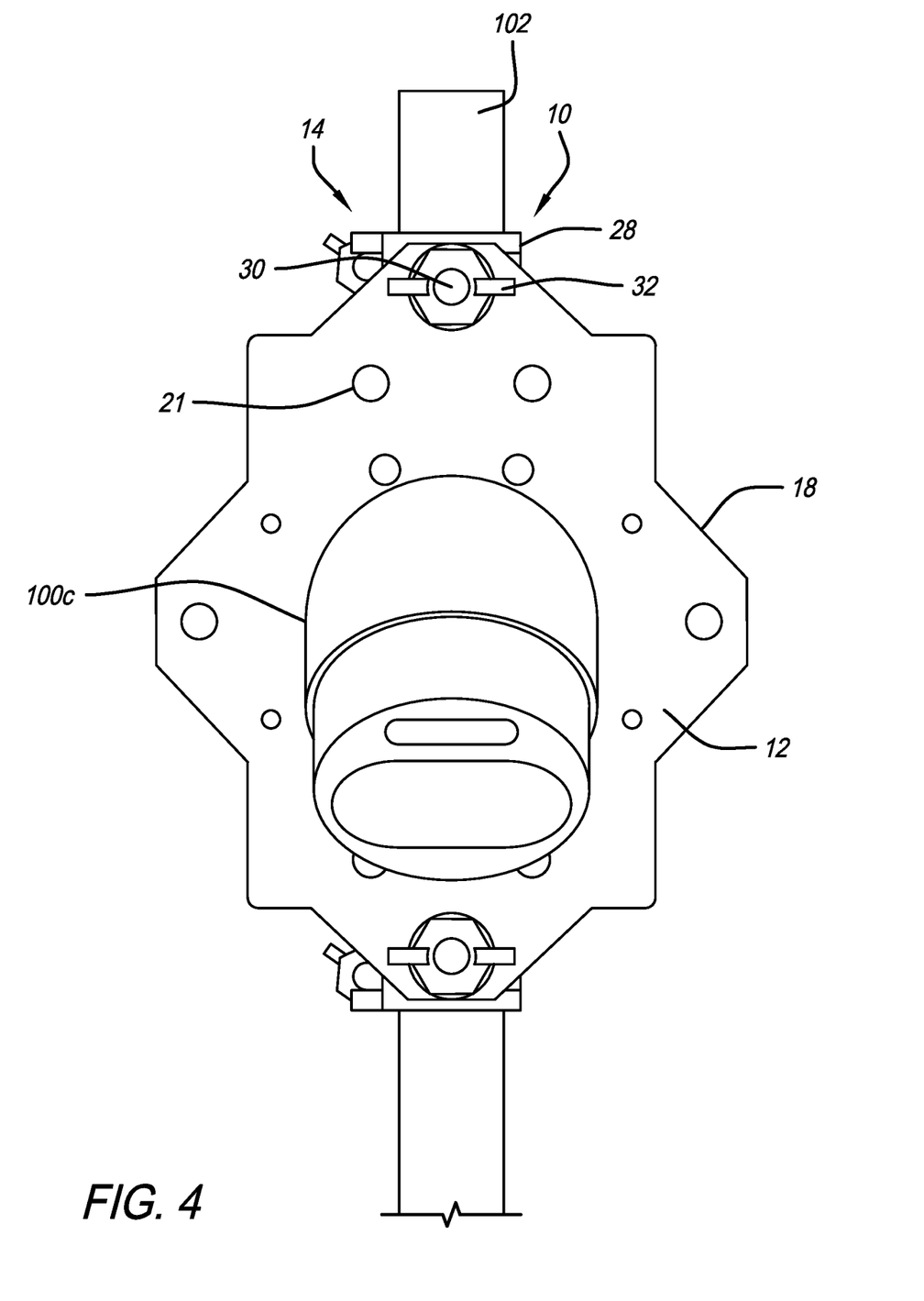
FIG. 4 is a front view of the mounting assembly of FIG. 1 in use with a third camera in accordance with a preferred embodiment of the present invention.

FIG. 4 is a front view of the mounting assembly 10 in use with a third camera 100c. The camera 100c may be shaped and sized such that fourth mounting holes 22 (see FIG. 2) and/or the opening 24 (see FIG. 2) are utilized to couple the camera 100c to the mounting plate 12 via fasteners passing therethrough.

Figure 5:
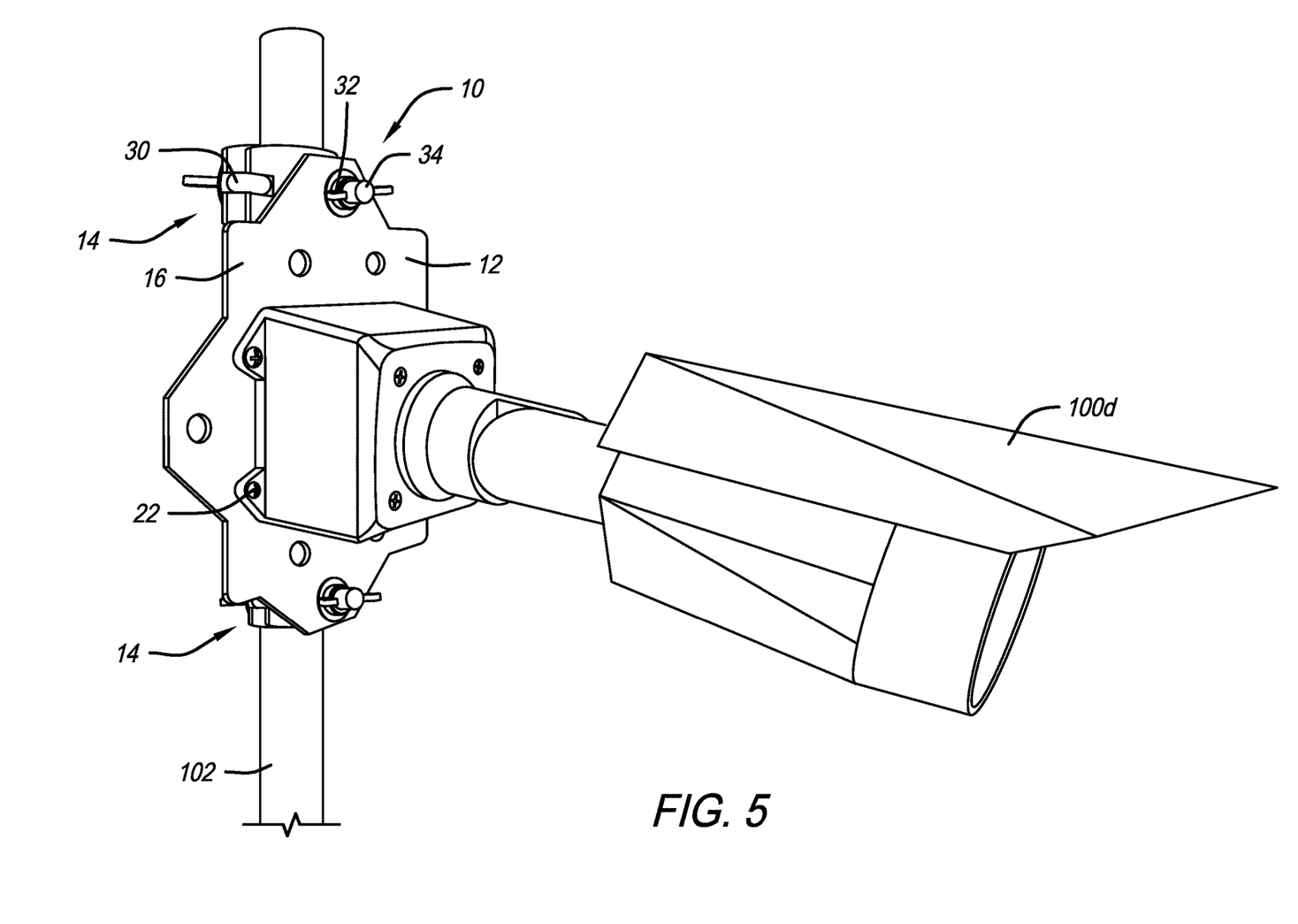
FIG. 5 is a perspective view of the mounting assembly of FIG. 1 in use with a fourth camera in accordance with a preferred embodiment of the present invention.

FIG. 5 is a perspective view of the mounting assembly 10 in use with a fourth camera 100d. The camera 100d may be shaped and sized such that fourth mounting holes 22 are utilized to couple the camera 100d to the mounting plate 12 via fasteners passing therethrough. As shown in FIG. 5, the fasteners from camera 100d pass through the rectangular fourth mounting hole set (see also FIG. 7).

Figure 6:
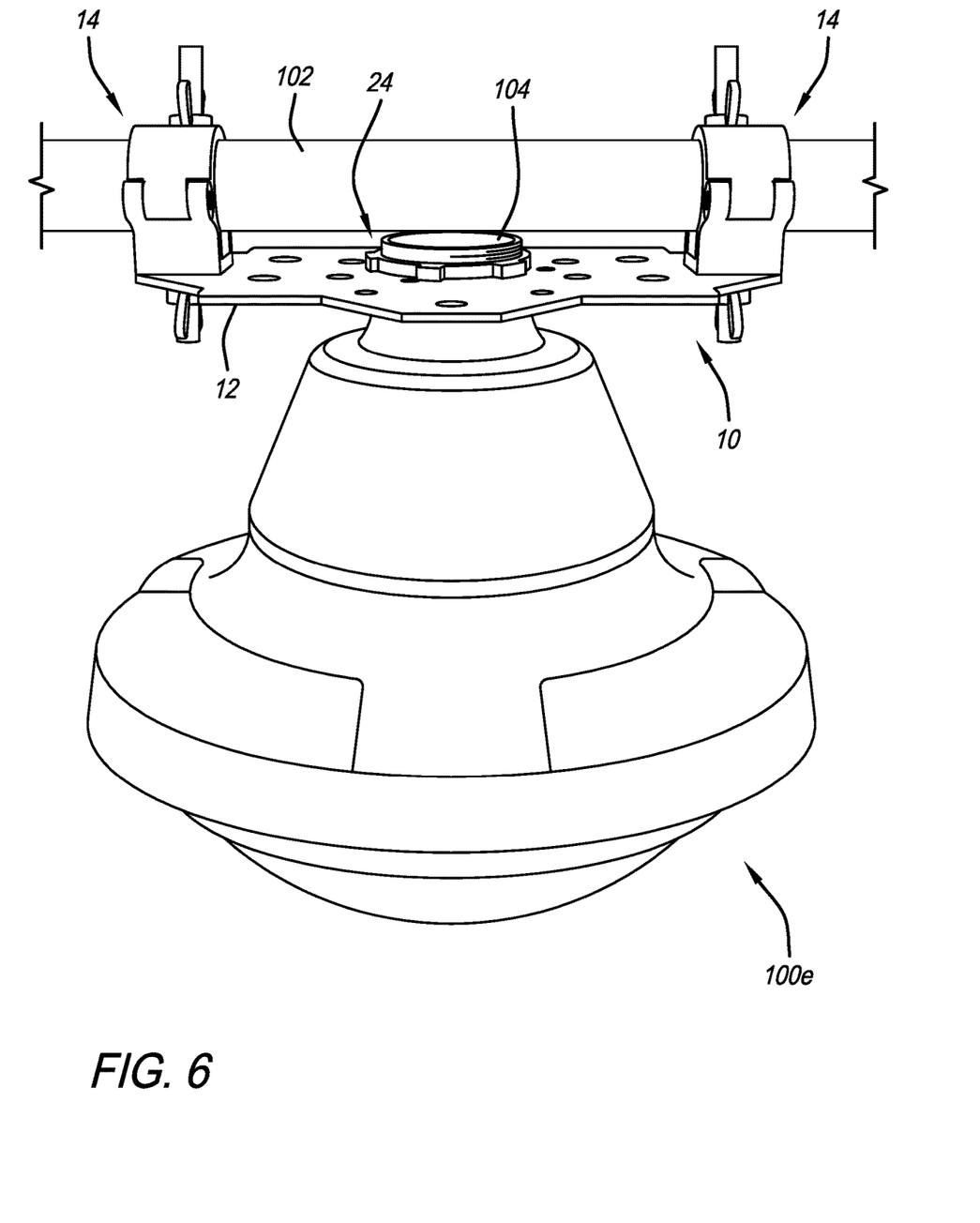
FIG. 6 is a side view of the mounting assembly of FIG. 1 in use with a fifth camera in accordance with a preferred embodiment of the present invention.

FIG. 6 is a side view of the mounting assembly 10 in use with a fifth camera 100e. The camera 100e may be shaped and sized such that the opening 24 is utilized to couple the camera 100e to the mounting plate 12 via one or more fasteners passing therethrough. A threaded portion 104 of the camera 100e may be extended through the opening 24. A nut or another fastener on the threaded portion 104 may be used to secure the camera to the mounting plate 12. The camera 100e and the mounting assembly 10 may be then mounted or attached to the horizontally oriented pole 102. The mounting plate 12 may be mounted perpendicular, angled, or parallel to a ground surface as shown in FIG. 6.

Figure 7:
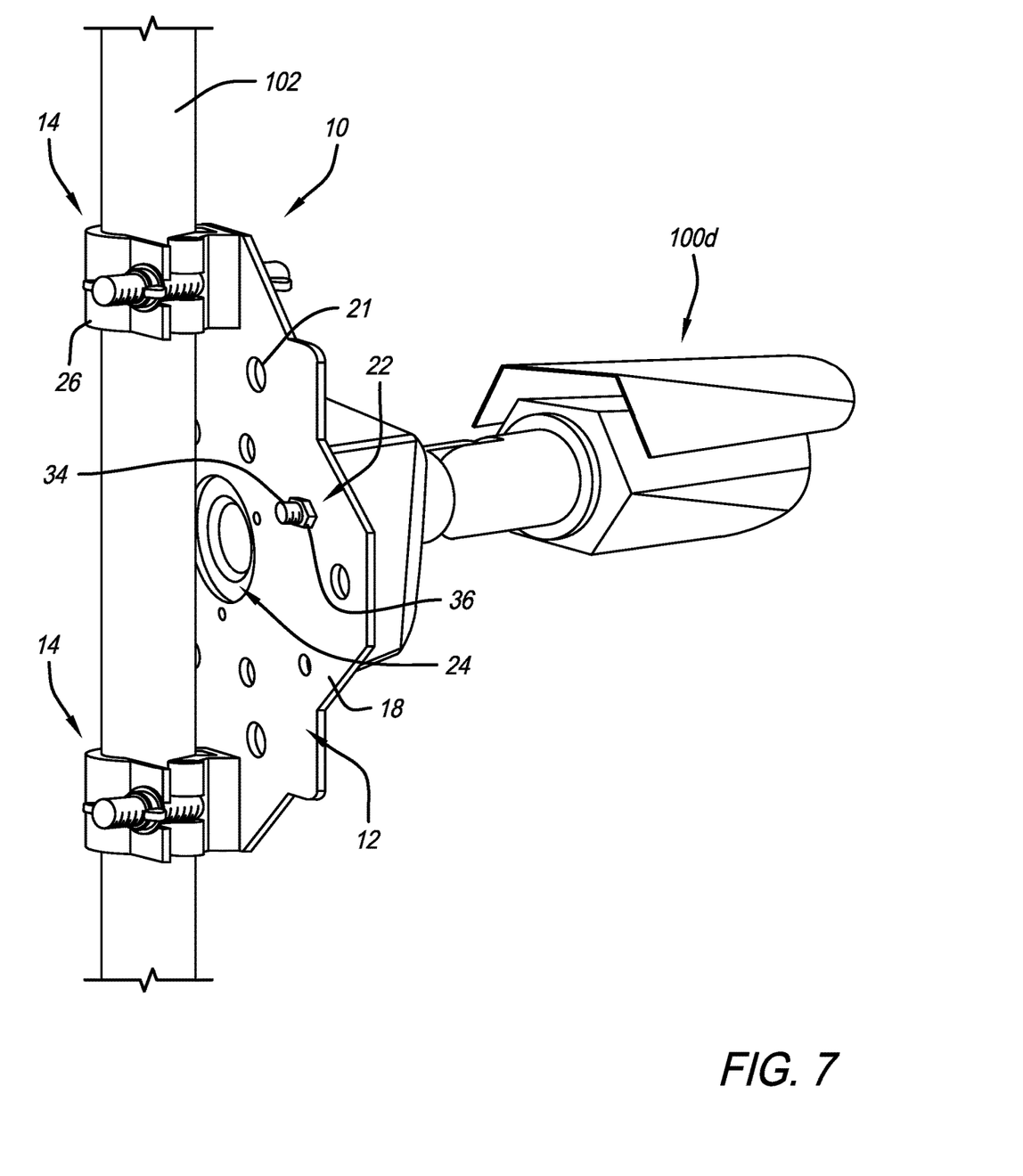
FIG. 7 is a rear perspective view of the mounting assembly of FIG. 1 in use with the fourth camera in accordance with a preferred embodiment of the present invention.

FIG. 7 is a rear perspective view of the mounting assembly 10 in use with the fourth camera 100d. The camera 100d may be mounted to the mounting plate 12 using threaded fasteners 34 extending from the camera 100d and secured in place with a nut 36 and then secured to the vertically oriented pole 102.

Figure 8:
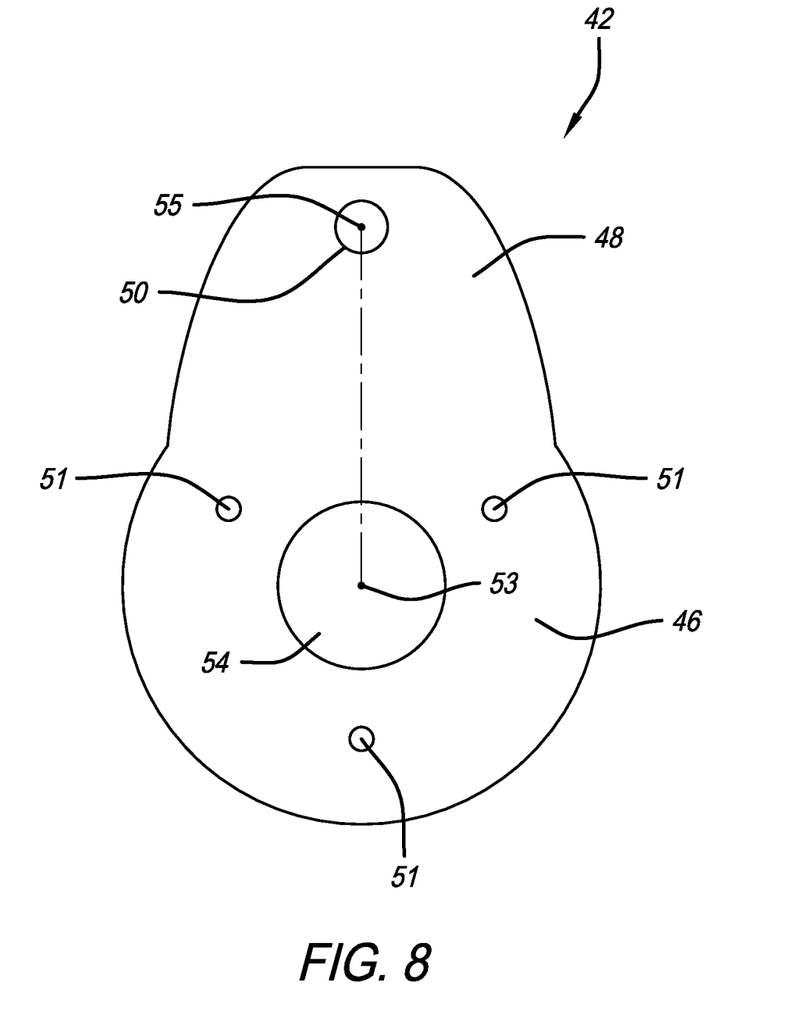
FIG. 8 is a front view of a mounting plate of a mounting assembly in accordance with a preferred embodiment of the present invention.

FIG. 8 is a front view of a mounting plate 42. The mounting plate 42 may be metal, plastic, wood, glass or other rigid material. The mounting plate 42 may be unitary construction or be an assembly. The mounting plate 42 may have a center portion 46. One or more extension members 48 may extend away from the center portion 46 as shown in FIG. 8. The center portion 46 may have a round shape as shown in FIG. 8. In other examples, the center portion 46 may be another shape, such as oval, square, triangular, or the like. The extension member 48 may form a pear shape with the center portion 46.

The extension member 48 may have a first mounting hole 50. The first mounting hole 50 may be shaped and sized to receive a first attachment or a fastener to couple the mounting plate 42 to the pole 102 and/or the clamp assembly 14, as shown in other figures. The first mounting hole 50 may preferably have an approximately 11 mm diameter.

The center portion 46 may have one or more second mounting holes 51. The second mounting hole 51 may be shaped and sized to receive a second attachment or a fastener to couple the mounting plate 42 to a camera 100, such as the camera 100c of FIG. 4. The second mounting hole 51 may preferably have an approximately 5 mm diameter. The first mounting hole 50 and a pair of second mounting holes 51 may form a triangular arrangement.

The center portion 46 may have an opening 54. The opening 54 may be round as shown in FIG. 8 or any other shape. The opening 54 may provide a path for an electrical conduit 25 (see FIG. 1) such as a power cord, an audio/video cord, and/or any other wiring to be electrically coupled to the camera 100. In some examples, the opening 54 may receive a fastener to couple the mounting plate 42 to a camera, such as the camera 100e (see FIG. 6). The opening 54 may preferably have an approximately 35 mm diameter. A center 53 of the opening 54 and a center 55 of the first mounting hole 50 may be aligned. The second mounting holes 51 may form an equilateral triangular shape around the opening 54 as shown in FIG. 8.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

Although the operations of any method(s) disclosed or described herein either explicitly or implicitly are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A camera mounting assembly for mounting a first camera, the camera mounting assembly comprising:
   a mounting plate having:
      a center portion having a first face and a second face opposing the first face, the center portion having one or more sides defined by a thickness between the first face and the second face, wherein the first face is flat and the second face is flat, and wherein the first face and the second face are parallel to one another,
      a plurality of extension members, wherein each extension member extends away from one of the one or more sides of the center portion, wherein the plurality of extension members are co-planar with the center portion,
      a plurality of first mounting holes each located on a different extension member of the plurality of extension members,
      a plurality of second mounting holes located on the center portion, the plurality of second mounting holes configured to receive the first camera,
      a plurality of third mounting holes located on the center portion and configured to receive a second camera, the second camera being different than the first camera,
      a plurality of fourth mounting holes located on the center portion and configured to receive a third camera, the third camera being different than the first camera and the second camera, wherein each of the first plurality of mounting holes, second plurality of mounting holes, third plurality of mounting holes and fourth plurality of mounting holes extend through the mounting plate from the first face to the opposing second face, and
      an opening located on the center portion, wherein the opening is configured to provide a path for an electrical conduit to be coupled to the first camera, and
   a first clamp assembly associated with a first of the plurality of first mounting holes, wherein the first clamp assembly includes a first fastener that extends through the first of the plurality of first mounting holes.

2. The camera mounting assembly of claim 1 wherein the first clamp assembly includes a hinged connection that includes a clamp portion hingedly connected to a hinge base, wherein the hinge base includes a pivotable threaded fastener that extends through a distal end of the clamp portion, wherein the pivotable threaded fastener is secured to the clamp portion by a nut, wherein the first fastener is a threaded fastener on the hinge base that extends oppositely of the clamp portion, and wherein the first fastener extends through the first of the plurality of first mounting holes to secure the first clamp assembly to the mounting plate.

3. The camera mounting assembly of claim 2 wherein the plurality of first mounting holes and the plurality of second mounting holes are mirrored about an axis bisecting the mounting plate.

4. The camera mounting assembly of claim 3 wherein the first of the plurality of first mounting holes and a pair of second mounting holes of the plurality of second mounting holes form a first triangular arrangement, wherein the first of the plurality of mounting holes and a pair of third mounting holes of the plurality of third mounting holes form a second triangular arrangement, wherein the first triangular arrangement is an equilateral triangle and the second triangular arrangement is an isosceles triangle, a base of the isosceles triangle having a length less than a length of the equilateral triangle.

5. The mounting plate of claim 1 wherein the plurality of first mounting holes each have a first diameter, the plurality of second mounting holes each have a second diameter, the plurality of third mounting holes each have a third diameter, and the plurality of fourth mounting holes each have a fourth diameter, the second diameter being greater than the third diameter and the third diameter being greater than the fourth diameter.

* * * * *